United States Patent [19]

Milunas et al.

[11] Patent Number: 5,151,858
[45] Date of Patent: Sep. 29, 1992

[54] MULTIPLE MODE ADAPTIVE PRESSURE CONTROL FOR AN AUTOMATIC TRANSMISSION

[75] Inventors: Rimas S. Milunas, Royal Oak; Larry T. Nitz, Troy, both of Mich.

[73] Assignee: Saturn Corporation, Troy, Mich.

[21] Appl. No.: 593,918

[22] Filed: Oct. 5, 1990

[51] Int. Cl.$^5$ .................. B60K 17/10; B60K 41/06
[52] U.S. Cl. ............................ 364/424.1; 74/866; 74/867; 74/864
[58] Field of Search ............... 364/424.1; 74/866, 867, 74/864

[56] References Cited

U.S. PATENT DOCUMENTS

| | | |
|---|---|---|
| 4,653,350 | 3/1987 | Downs et al. ............... 74/864 |
| 4,707,789 | 11/1987 | Downs et al. ............ 364/424.1 |
| 4,928,557 | 5/1990 | Takeda et al. ............... 74/867 |
| 4,949,595 | 8/1990 | Shimanaka ................. 74/866 |
| 4,953,090 | 8/1990 | Narita ....................... 364/424.1 |
| 4,955,256 | 9/1990 | Kashihara et al. ........... 74/866 |
| 4,956,776 | 9/1990 | Carre ......................... 364/424.1 |
| 4,969,098 | 11/1990 | Leising et al. ............... 364/424.1 |
| 4,998,451 | 3/1991 | Sano ........................... 74/867 |
| 5,007,308 | 4/1991 | Narita ....................... 74/866 |

Primary Examiner—Parshotam S. Lall
Assistant Examiner—Collin W. Park
Attorney, Agent, or Firm—Mark A. Navarre

[57] ABSTRACT

A transmission shift control having both multiple shift pressure moding and adaptive pressure schedule adjustment. A predetermined pressure schedule is used to develop an open-loop pressure command for the post-fill phase of the on-coming clutch in each upshift. Regardless which shift mode is selected, the controller measures the duration of the shift and compares the measured duration to an expected duration which will occur if the shift progresses as desired. The deviation, if any, is used to develop an adaptive correction amount, which is applied to shift mode dependent tables. In the base (Normal) mode, the pressure is determined in accordance with the pressure command from the predetermined pressure schedule, adjusted by an adaptive correction amount from a Normal mode correction table. In the Performance mode, the pressure command from the predetermined schedule is adjusted by adaptive correction amounts from both the Normal mode correction table and a Performance mode correction table. The Performance mode correction table is initialized at a minimum value which maintains at least a minimum pressure differentiation between the Normal and Performance modes so that a switch from the Normal mode to the Performance mode will always result in a firmer, sportier shift feel.

7 Claims, 15 Drawing Sheets

MULTIPLE MODE ADAPTIVE PRESSURE CONTROL FOR AN AUTOMATIC TRANSMISSION

This invention relates to an adaptive control of the pressure supplied to the torque transmitting devices of an automatic transmission, and more particularly, to an adaptive control which incorporates multiple driver selected shift modes.

BACKGROUND OF THE INVENTION

Electronic controls have been employed for performing various transmission shift control functions, including main or line pressure regulation, shift point scheduling and clutch pressure control during shifting. Such controls are typically much more flexible then the hydraulic controls they replace, enabling the use of mode selection for customizing the transmission operation to suit the operator of the vehicle. Commonly, two or more modes, such as Normal and Performance are designated. In the Normal mode, shifting is scheduled at relatively low engine speed and pressure levels to achieve good fuel economy and a smooth shift feel. In the Performance mode, shifting is scheduled at higher engine speed and pressure levels to achieve improved part-throttle performance and a crisp shift feel.

Shift point scheduling is reasonably straight forward, but clutch pressure control is relatively complicated due to performance changes with wear and age, and part-to-part variability in general. Consequently, some sort of feedback is generally employed to ensure that the desired shift feel/quality is actually achieved.

The present invention pertains to a control in which the supply of fluid to an on-coming clutch during shifting is carried out in accordance with a predetermined pressure schedule, trimmed by an adaptive or learned adjustment. In a specific example of this type of control, described in detail in the U.S. Pat. No. 4,653,350 to Downs et al., issued Mar. 31, 1987, and assigned to General Motors Corporation, a base open-loop pressure schedule provides a desired clutch pressure as a function of time and torque inputs, and the control energizes a solenoid-operated hydraulic valve at a duty cycle or current level for achieving the desired pressure. The duration of the shift is measured and compared to a desired or reference duration, and an adaptive pressure correction term is developed in relation to the difference, if any. In subsequent shifting to the same speed ratio, the pressure command derived from the open-loop pressure schedule is adjusted by the adaptive correction term. In this way, the correction amount provides the feedback for adaptively adjusting the base open-loop control to compensate for the variations referred to above.

The incorporation of both multiple shift pressure moding and adaptive pressure controls poses a significant control difficulty for a number of reasons. For example, adaptive pressure corrections determined in one mode may not apply to the other mode. As a result, the unselected mode does not benefit from the information learned while operating in the selected mode, and in some cases, differentiation between modes may be virtually nonexistent or reversed.

SUMMARY OF THE PRESENT INVENTION

The present invention is directed to an improved transmission shift control which employs both multiple shift pressure moding and adaptive pressure schedule adjustment, wherein differentiation between shift modes is maintained, and adaptive pressure adjustments are applied to the appropriate shift modes.

The predetermined pressure schedule is stored in the form of an electronic look-up table as a function of input torque and elapsed shift time, and is used to develop an open-loop pressure command for the post-fill phase of the on-coming clutch in each upshift. Regardless which shift mode is selected, the controller measures the duration of the completion or inertia phase of the shift and compares the measured duration to an expected duration which will occur if the shift progresses as desired. The deviation, if any, between the measured and expected durations is used to develop an adaptive correction amount, which when added to the predetermined pressure schedule will produce a more optimum shift. The adaptive correction amounts are stored in shift mode dependent tables as a function of input torque and target ratio, and are applied to the predetermined pressure schedule as described below.

In the illustrated embodiment, the driver may select either the Normal or Performance modes. In the Normal mode, the shift points are scheduled for fuel efficiency, and the shifts are carried out at a pressure level to achieve a smooth, unobtrusive shift characteristic. In the Performance mode, the shift points are scheduled take advantage of the engine performance curve, and the shifts are carried out at a somewhat higher pressure level to achieve a firm, sporty shift characteristic.

The pressure level used during the Normal mode is determined in accordance with the pressure command from the predetermined pressure schedule, adjusted by an adaptive correction amount from a Normal mode correction table. In the Performance mode, the pressure command from the predetermined pressure schedule is adjusted by adaptive correction amounts from both the Normal mode correction table and a Performance mode correction table. The Performance mode correction table is initialized at a minimum value which maintains at least a minimum pressure differentiation between the Normal and Performance modes. In other words, a switch from the Normal mode to the Performance mode will always result in a firmer, sportier shift feel.

In most instances, adaptive correction amounts determined in the Normal mode are applied to the Normal mode correction table, and adaptive correction amounts determined in the Performance mode are applied to the Performance mode correction table. Once the minimum value of the Performance mode correction table is reached, however, correction amounts which would require significant further pressure reduction are applied to the Normal mode correction table. This maintains the pressure differentiation between modes, while still providing adaptive pressure correction.

According to another aspect of this invention, Performance mode shifts are carried out such that the adaptive correction amount from the Performance mode correction table is ramped in as a function of time. In other words, the clutch pressure is initiated at the Normal mode level, and builds during the shift to the Performance mode level. This technique provides a smooth shift entry with an exciting finish.

According to a further aspect of this invention, the controller is adapted to increase the on-coming clutch pressure independent of the open-loop commanded pressure if it is determined that the shift is not progressing at a fast enough rate. Specifically, extra pressure is added if the rate of speed ratio change is less than a reference rate. Since the shift is initiated at the Normal mode pressure regardless of the shift mode selected by the driver, the need for independent pressure increases indicates that an adaptive correction should be applied to both the Normal and Performance modes. Thus, independent pressure increases, if any, are converted into a pressure correction and applied to the Normal mode correction table regardless of the shift mode selected by the driver. The correction affects the Performance mode as well as the Normal mode since the Performance mode pressure is determined in part by the correction amounts stored in the Normal mode correction table.

BRIEF DESCRIPTION OF THE DRAWINGS

FIG. 2 depicts a Normal mode high quality upshift; FIG. 3 depicts a Performance mode high quality upshift; FIG. 4 depicts a Normal mode overpressured upshift; FIG. 5 depicts a Normal mode underpressured upshift; and FIG. 6 depicts a Normal mode underpressured upshift with pressure correction according to this invention.

FIG. 7 depicts an open-loop upshift on-coming pressure schedule; FIG. 8 depicts the change in speed ratio observed in the course of an upshift; and FIG. 9 depicts gain factors used in adaptively correcting the pressure schedule of FIG. 7.

FIG. 10 is a main flow diagram; FIG. 11 is a subroutine flow diagram pertaining to pressure command determination; FIG. 12 is a subroutine flow diagram pertaining to upshift logic and control; FIG. 13 is a subroutine flow diagram pertaining to closed-loop pressure logic; FIG. 14 is a subroutine flow diagram pertaining to adaptive pressure; and FIGS. 15-16 depict a subroutine flow diagram pertaining to adaptive pressure correction.

DETAILED DESCRIPTION OF THE DRAWINGS

Figure 1A:
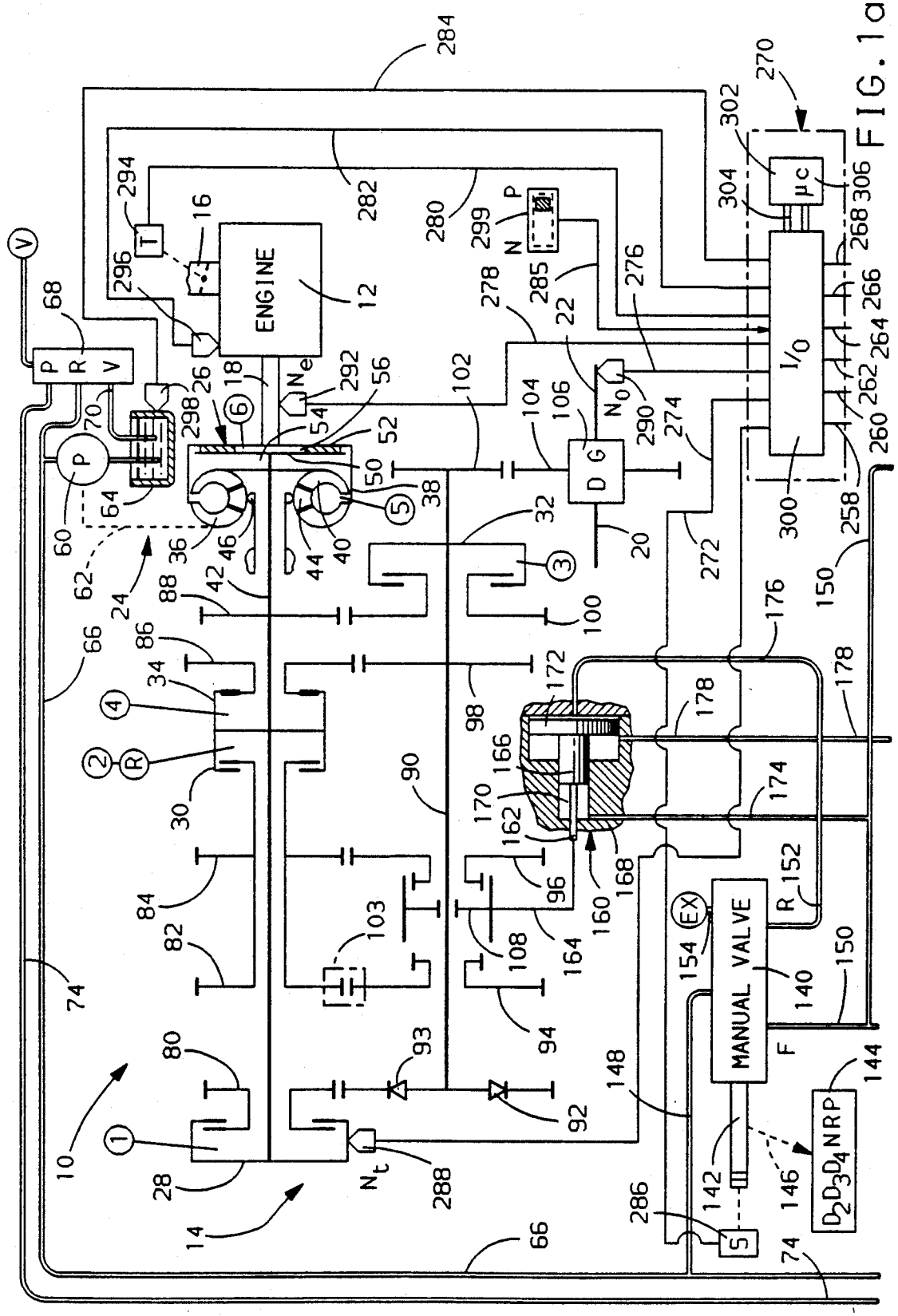
FIGS. 1a-1b schematically depict a computer-based electronic transmission control system controlled according to this invention.
Figure 1B:
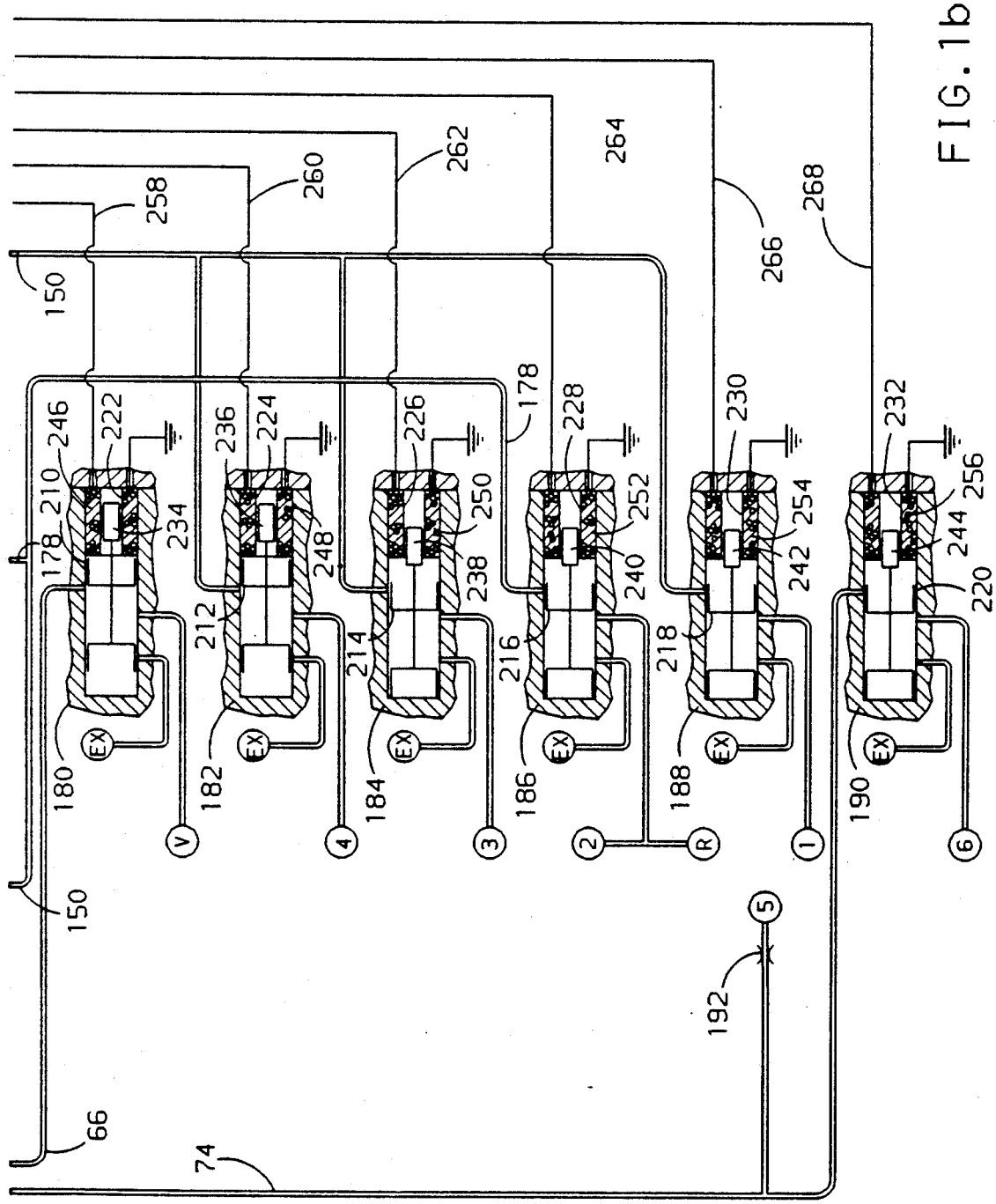

Referring particularly to FIGS. 1a and 1b, the reference numeral 10 generally designates a motor vehicle drivetrain including an engine 12 and a parallel shaft transmission 14 having a reverse speed ratio and four forward speed ratios. Engine 12 includes a throttle mechanism 16 mechanically connected to an operator manipulated device, such as an accelerator pedal (not shown) for regulating engine output torque, such torque being applied to the transmission 14 through the engine output shaft 18. The transmission 14 transmits engine output torque to a pair of drive axles 20 and 22 through a torque converter 24 and one or more of the fluid operated clutching devices 26-34, such clutching devices being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14.

The torque converter 24 also includes a clutching device 26 comprising a clutch plate 50 secured to the shaft 42. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38 as shown in FIG. 1, thereby engaging the clutching device 26 to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36, as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in Schuster U.S. Pat. No. 4,342,545 issued Aug. 3, 1982, and a representative pressure regulator valve is disclosed in Vukovich U.S. Pat. No. 4,283,970 issued Aug. 18, 1981, such patents being assigned to the assignee of the present invention.

The transmission shaft 42 and a further transmission shaft 90 each have a plurality of gear elements rotatably supported thereon. The gear elements 80-88 are supported on shaft 42 and the gear elements 92-102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28-34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28-34 is biased toward a disengaged state by a return spring (not shown).

Engagement of the clutching device is effected by supplying fluid pressure to an apply chamber thereof. The resulting torque capacity of the clutching device is a function of the applied pressure less the return spring pressure, hereinafter referred to as the working pressure pressure. The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80-88 and 92-100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28-34 in a released condition. The speed ratios defined by the various gear element pairs are generally characterized by the ratio of the turbine speed $N_t$ to output speed $N_o$. Representative $N_t/N_o$ ratios for transmission 14 are as follows:

| | |
|---|---|
| First - 2.368 | Second - 1.273 |
| Third - 0.808 | Fourth - 0.585 |
| Reverse - 1.880 | |

Shifting from a current forward speed ratio to a desired forward speed ratio requires that the clutching device associated with the current speed ratio (off-going) be disengaged, and the clutching device associated with the desired speed ratio (on-coming) be engaged. For example, a shift from the first forward speed ratio to the second forward speed ratio involves disengagement of the clutching device 28 and engagement of the clutching device 30. As explained below, the timing of such disengagement and engagement is critical to the attainment of high quality shifting, and this invention is directed primarily to a control system for supplying fluid pressure to the various clutching devices 28-34 to achieve consistent high quality shifting.

The fluid control elements of the transmission 14 include a manual valve 140, a directional servo 160 and a plurality of electrically operated fluid valves 180-190. The manual valve 140 operates in response to operator demand and serves, in conjunction with directional servo 160, to direct regulated line pressure to the appropriate fluid valves 182-188. The fluid valves 182-188, in turn, are individually controlled to direct fluid pressure to the clutching devices 28-34. The fluid valve 180 is controlled to direct fluid pressure from the pump output line 66 to the pressure regulator valve 68, and the fluid valve 190 is controlled to direct fluid pressure from the line 74 to the clutching device 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148, and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3 or D2 positions shown on the indicator mechanism 144, line pressure from the line 148 is directed to the forward (F) output line 150.

When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180-190 each receive fluid pressure at an input passage thereof from the pump 60, and are individually controlled to direct fluid pressure to the pressure regulator valve 68 or respective clutching devices 26-34. The fluid valve 180 receives line pressure directly from pump output line 66, and is controlled to direct a variable amount of such pressure to the pressure regulator valve 68, as indicated by the circled letter V. The fluid valves 182, 186 and 188 receive fluid pressure from the forward output line 150 of manual valve 140, and are controller to direct variable amounts of such pressure to the clutching devices 34, 32 and 28, as indicated by the circled numerals 4, 3 and 1, respectively.

The fluid valve 186 receives fluid pressure from the forward output line 150 and the directional servo output line 178, and is controlled to direct a variable amount of such pressure to the clutching device 30, as indicated by the circled numeral 2 and the circled letter R. The fluid valve 190 receives fluid pressure from line 74 of pressure regulator valve 68, and is controlled to direct a variable amount of such pressure to the release chamber 56 of the clutching device 26, as indicated by the circled numeral 6. The apply chamber 54 of the clutching device 26 is supplied with fluid pressure from the output line 74 via the orifice 192, as indicated by the circled numeral 5.

Each of the fluid valves 180-190 includes a spool element 210-220, axially movable within the respective valve body for directing fluid flow between input and output passages. When a respective spool element 210-220 is in the rightmost position as viewed in FIG. 1, the input and output passages are connected. Each of the fluid valves 180-190 includes an exhaust passage, as indicated by the circled letters EX, such passage serving to drain fluid from the respective clutching device when the spool element is shifted to the leftmost position as viewed in FIG. 1.

In FIG. 1, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180-190 includes a solenoid 222-232 for controlling the position of its spool element 210-220. Each such solenoid 222-232 comprises a plunger 234-244 connected to the respective spool element 210-220 and a solenoid coil 246-256 surrounding the respective plunger. One terminal of each such solenoid coil 246-256 is connected to ground potential as shown, and the other terminal is connected to an output line 258-268 of a control unit 270 which governs the solenoid coil energization. As set forth hereinafter, the control unit 270 pulse-width-modulates the solenoid coils 246-256 according to a predetermined control algorithm to regulate the fluid pressure supplied to the pressure regulator 68 and the clutching devices 26-34, the duty cycle of such modulation being determined in relation to the desired magnitude of the supplied pressures.

While the fluid valves 180-190 have been illustrated as spool valves, other types of valves could be substituted therefor. By way of example, valves of the ball and seat type could be used. In general terms, the fluid valves 180-190 may be mechanized with any three-port pulse-width-modulated valving arrangement.

Input signals for the control unit 270 are provided on the input lines 272-285. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276 and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed $N_o$; and the speed transducer 292 senses the velocity of the engine output shaft 18 and therefore the engine speed $N_e$.

The position transducer 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284. A shift mode selection switch 299 mounted on the vehicle instrument panel (not shown) provides an input on line 285 indicating the driver's selection of the Normal or Performance shift modes.

The control unit 270 responds to the input signals on input lines 272-285 according to a predetermined control algorithm as set forth herein, for controlling the energization of the fluid valve solenoid coils 246-256 via output lines 258-268. As such, the control unit 270 includes an input/output (I/O) device 300 for receiving the input signals and outputting the various pulse-width-modulation signals, and a microcomputer 302 which communicates with the I/O device 300 via an address-and-control bus 304 and a bi-directional data bus 306. Flow diagrams representing suitable program instructions for developing the pulse-width-modulation outputs in accordance with the teachings of this invention are depicted in FIGS. 10-16.

As indicated above, every shift from one speed ratio to another involves disengagement of an off-going clutching device and engagement of an on-coming clutching device. Each shift includes a fill phase during which the apply chamber of the on-coming clutch is filled with fluid, a torque phase during which the torque capacity of the off-going clutching device is reduced and the torque capacity of the on-coming clutching device is increased, and an inertia phase during which the turbine is accelerated to a new velocity determined according to the new speed ratio. Such phases are defined in terms of times $t_0$-$t_4$ for a typical Normal mode and Performance mode 2-3 upshifts in graphs A-D of FIGS. 2-3, respectively, the graphs in each Figure being depicted on a common time base. In each figure, Graph A depicts the turbine speed $N_t$; Graph B depicts the pressure command for the on-coming clutching device fluid valve; Graph C depicts the engine torque $T_e$ and the torque carried by the clutching devices 30 and 32; and Graph D depicts the transmission output torque $T_o$.

Prior to the shift activity, the relation between the turbine and output speeds $N_t$ and $N_o$ is static and determined according to the second speed ratio. In addition, the output torque $T_o$ is substantially constant. In the course of the shift, the speed and torque relationships become dynamic as the engine torque $T_e$ is shifted from the clutching device 30 to the clutching device 32. Following the shift activity, the output torque is once again substantially constant, and the relation between $N_t$ and $N_o$ is determined according to the third speed ratio.

Figure 2:
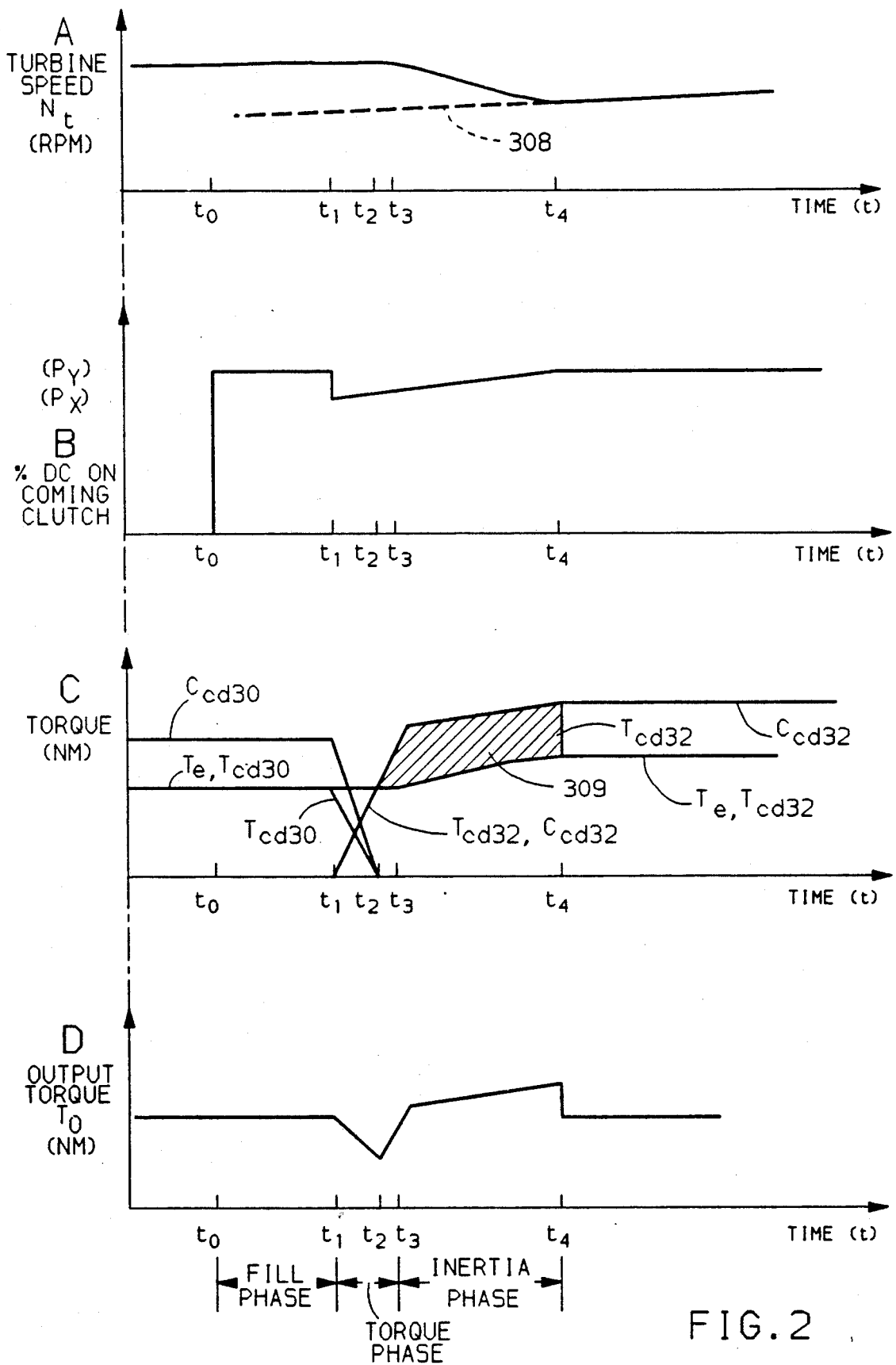
FIGS. 2-6 graphically depict various transmission and control parameters occurring in the course of different upshifts.

Referring particularly to FIG. 2, time $t_0$ designates the initiation of a 2-3 ratio shift. At such point, the solenoid coil 250 of fluid valve 184 is energized at a high duty cycle to commence filling the apply chamber of clutching device 32. This marks the beginning of the fill phase of the shift, as indicated below Graph D. Although not shown in FIG. 2, the solenoid coil 252 of fluid valve 186 is energized at a relatively high duty cycle during the fill phase to maintain engagement of the second speed ratio. At time $t_1$, $t_{fill}$ seconds after time $t_0$, the fluid pressure in the apply chamber of clutching device 32 is sufficiently great to compress the clutch return spring, marking the end of the fill phase and the beginning of the torque phase, as indicated below Graph D. Thereafter, the pressure command is reduced to a value corresponding to a predetermined initial pressure $P_x$ and progressively increased to a value corresponding to a predetermined final pressure $P_y$. During such time, the torque $T_{cd32}$ carried by the on-coming clutching device 32 progressively increases and the torque $T_{cd30}$ carried by the off-going clutching device 30 progressively decreases, as seen in Graph C. The output torque $T_o$ in this interval is determined according to the sum of $T_{cd30}$ and $T_{cd32}$ as reflected through the respective speed ratios of transmission 14, and progressively decreases as seen in Graph D.

At time $t_2$, the torque $T_{cd32}$ equals the engine torque $T_e$, the torque $T_{cd30}$ is reduced to zero, and the output torque $T_o$ begins to rise with $T_{cd32}$, as seen in Graphs C-D. After time $t_2$, the torque $T_{cd32}$ continues to rise and the torque differential between it and the engine torque $T_e$ urges the turbine to decelerate to the third ratio speed, designated by the trace 308 in Graph A. At time $t_3$, the turbine speed $N_t$ has substantially decreased, marking the beginning of the timed inertia phase as indicated below Graph D. As the turbine speed $N_t$ decreases, the engine torque $T_e$ increases, as seen in Graph C. At time $t_4$, the turbine speed joins the third speed trace 308, marking the end of the inertia phase and the shift as indicated below Graph D. Since the clutching device 32 is no longer slipping at such point, the torque $T_{cd32}$ drops to the level of the engine torque $T_e$, and the output torque $T_o$ drops to the post-shift level. The shaded area 309 between the $T_e$ and $T_{cd32}$ traces in Graph C is referred to as the inertia torque and represents the amount of torque the on-coming clutching device must exert to effect the speed change.

Figure 3:
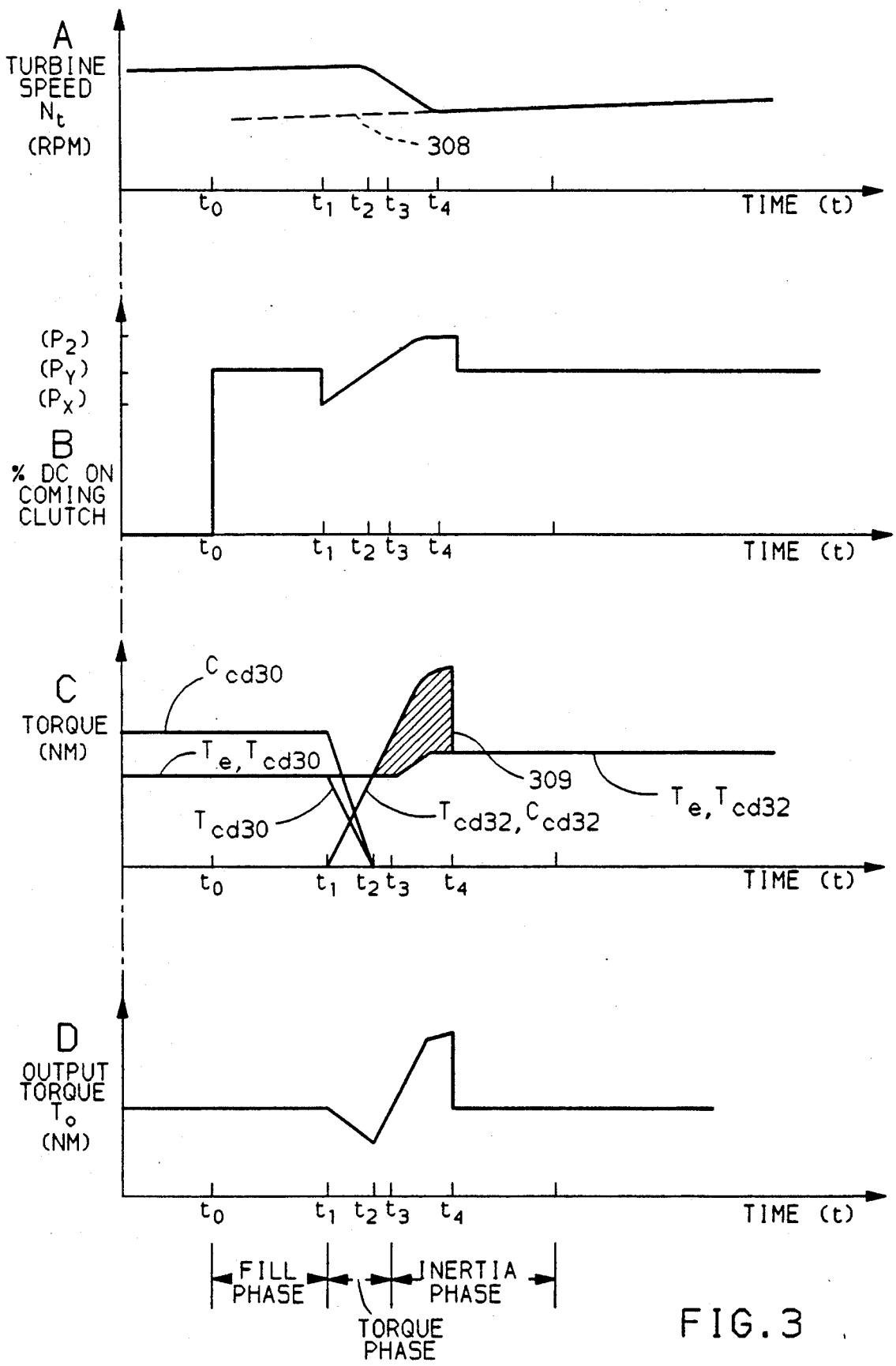

Referring now to the Performance mode shift of FIG. 3, and particularly to Graph B, it will be seen that the on-coming clutch pressure is initiated at the predetermined pressure $P_x$ as in the Normal mode upshift of FIG. 2 to provide a smooth entry into the shift. However, the pressure increases at a substantially higher rate, peaking at a higher final pressure S. This produces a corresponding increase in the torque $T_{cd32}$ carried by the on-coming clutching device 32, as indicated in Graph C. The inertia torque represented by area 309 quickly decelerates the turbine to the third speed trace 308, completing the shift. Since the clutching device 32 is no longer slipping at this point, the torque $T_{cd32}$ drops to the engine torque $T_e$, and the output torque $T_o$ drops to the post-shift level. As represented by the output torque trace in Graph D, the Performance mode delivers a firm, crisp shift feel, compared to the Normal mode shift of FIG. 2.

The clutch pressure schedules are individually determined for each ratio shift. If the scheduled pressure is correct, and the various control elements each function as expected, the ratio shift will progress in the desired manner as depicted in FIG. 2, with neither excessive harshness nor excessive slippage of the friction devices. These are the essential ingredients of open loop ratio shifting. As indicated above, however, a certain amount of variation in the engine and transmission operating characteristics can be expected over the life of the vehicle due to wear. Moreover, there may be some vehicle-to-vehicle variability due to assembly and component tolerances. In these cases, the clutch pressure during the torque and inertia phases will be too high or too low for a given operating condition, and the shift quality may be degraded. The consequences of improperly high and low pressure scheduling are graphically illustrated in FIGS. 4 and 5 for a Normal mode 2-3 upshift.

Figure 4:
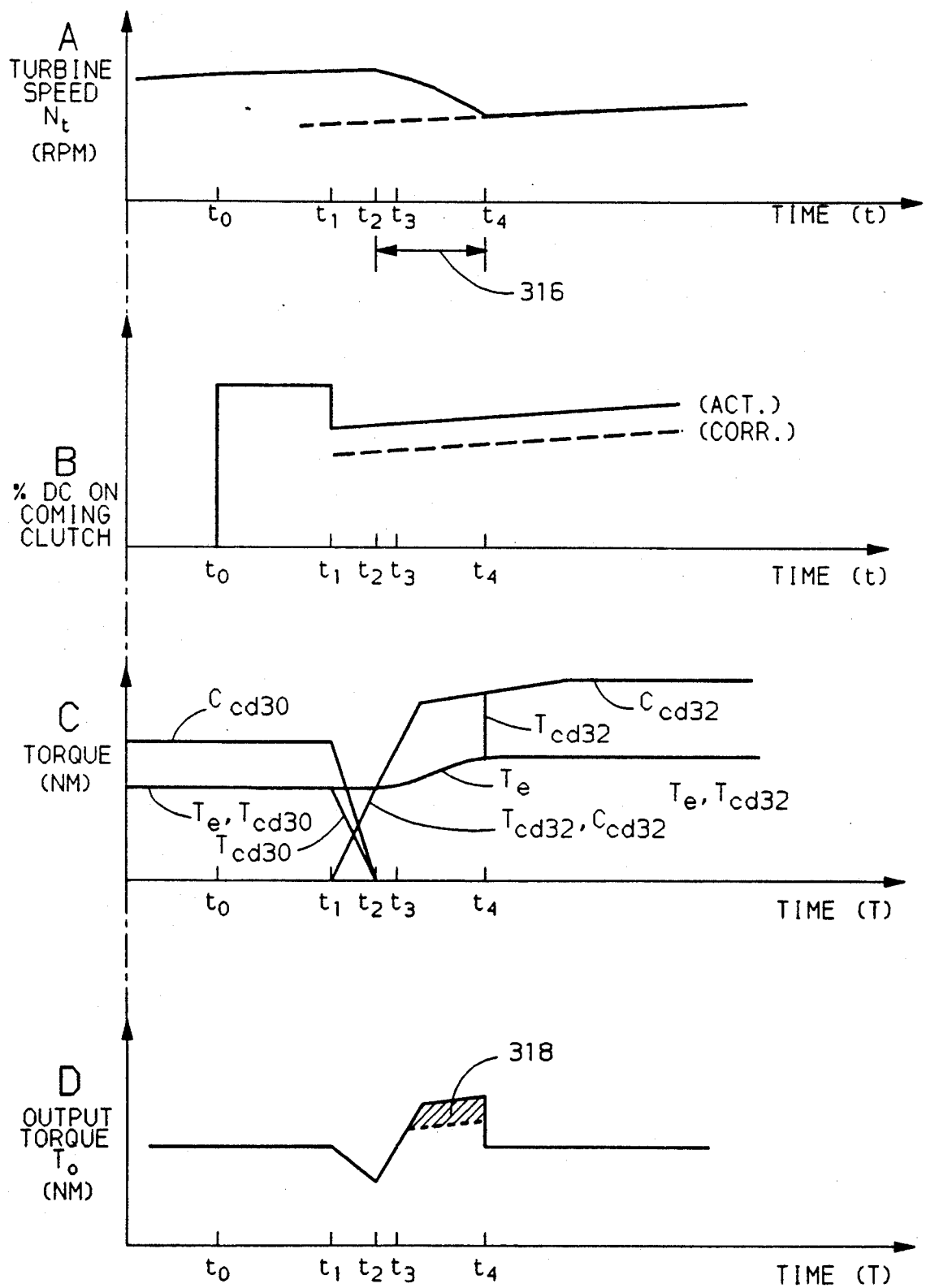
Figure 5:
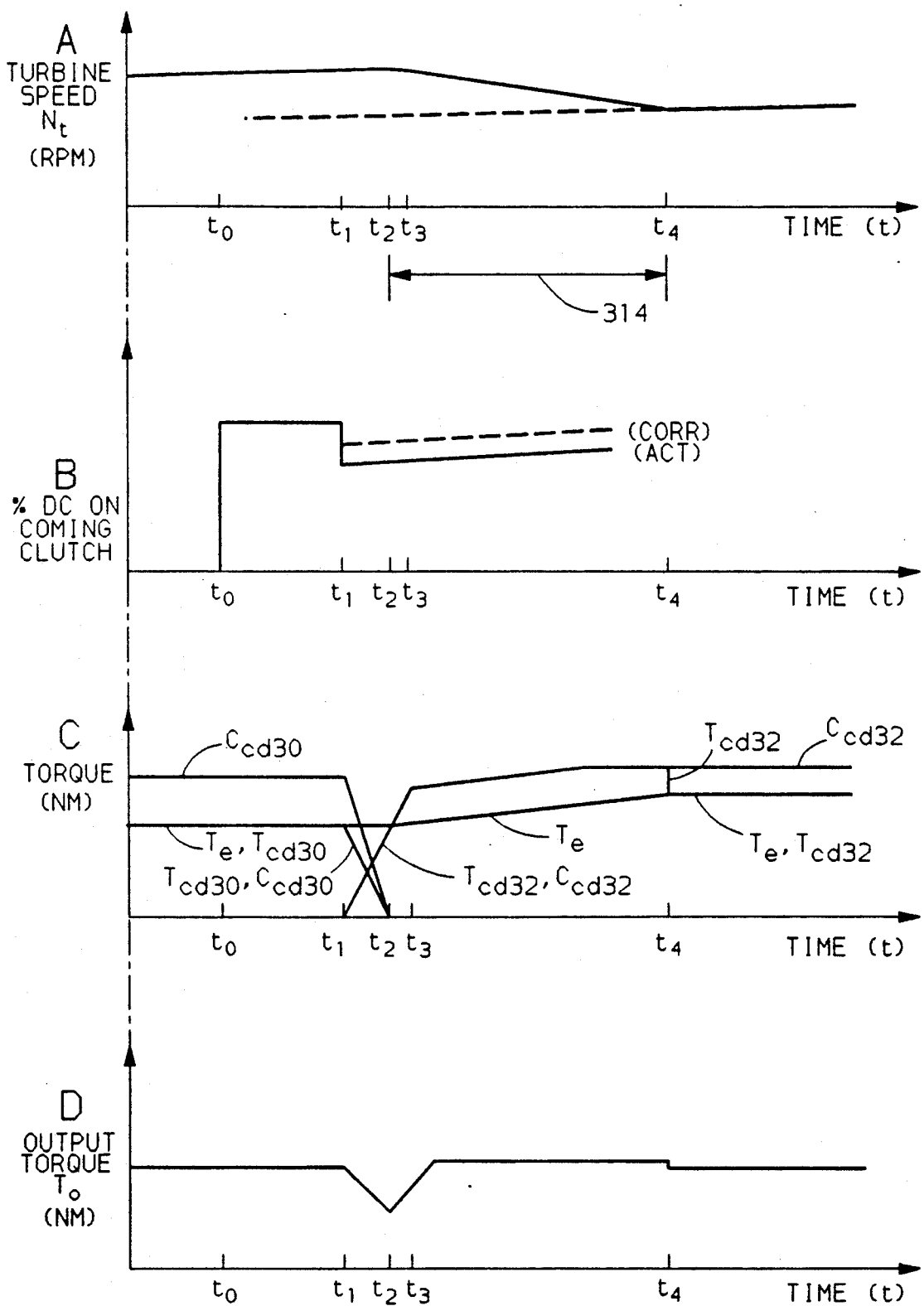

FIGS. 4 and 5 each include Graphs A, B, C and D corresponding to the Graphs A, B, C and D of FIG. 2. To facilitate comparison of the various traces with the corresponding traces of FIG. 2, each of the graphs of FIGS. 4-5 includes the time scale designations $t_0$-$t_4$ as defined in reference to the Normal mode high quality shift of FIG. 2. In addition, the static torque and speed levels shown in FIG. 2 have been adopted in FIGS. 4-5. In each case, both the correct and actual pressure commands are indicated in Graph B.

When the scheduled pressure for the on-coming clutching device is too high, as indicated in Graph B of FIG. 4, the torque capacity $C_{cd32}$ is increased, as compared to FIG. 2, and the turbine is rapidly decelerated to its new speed as seen in Graph A. As a result, the duration of the inertia phase is relatively short, as designated by the interval 316. In addition, the rapid turbine deceleration causes a transient increase in the output torque $T_o$, as indicated by the shaded area 318 in Graph D, and produces an undesirably harsh Normal mode shift.

When the scheduled pressure for the on-coming clutching device is too low, as indicated in Graph B of FIG. 5, the torque capacity $C_{cd32}$ is reduced as compared to FIG. 2. As a result, the duration of the inertia phase becomes excessively long, degrading the shift quality and inducing excessive wear and heating of the clutching devices. For the example depicted in FIG. 5, the length of the inertia phase is designated by the interval 314.

If the on-coming clutch is underpressured by a large margin, the shift will fail to progress, as evidenced for example, by an insufficient rate of change of speed ratio. In this case, the control of the present invention independently increases the open-loop pressure command to achieve at least a minimum turbine deceleration.

Figure 6:
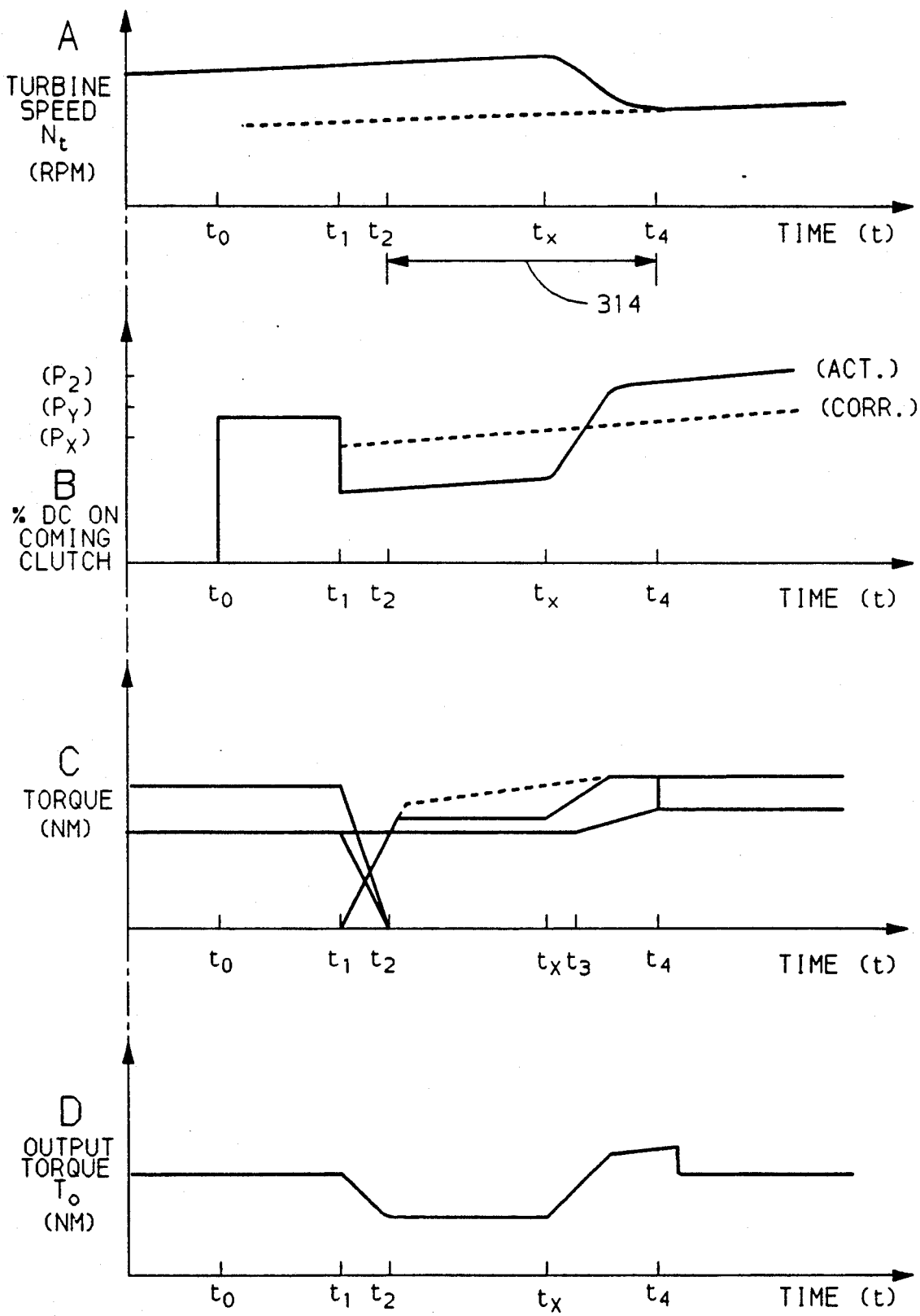

An example of the independent or closed-loop pressure increase is given in FIG. 6, which depicts an under-pressured Normal mode 2-3 upshift. As with FIGS. 4-5, FIG. 6 includes Graphs A, B, C and D corresponding to the Graphs A, B, C and D of FIG. 2, and employs the same time scale designations $t_0$–$t_4$. As indicated in Graph B, the actual pressure command (ACT) is well below the correct value (CORR) in the initial portion of the shift, and the turbine speed turn-down does not occur when expected. In this situation, the control unit responds by independently increasing the on-coming clutch pressure command, commencing at time $t_x$ in Graph B. The pressure increase is closed-loop in that the pressure is ramped in until a desired rate of change in turbine speed $N_t$ is observed, at time $t_3$. Unlike a classical closed-loop control, this control is employed only to increase the pressure, and not to decrease the pressure.

Both the Normal and Performance mode pressures are scheduled as a function of a torque variable $T_v$. The torque variable $T_v$, in turn, is determined as a function of the gear set input torque $T_i$, and the entry turbine speed $N_{te}$, $N_{te}$ being defined as the turbine speed $N_t$ at the end of the fill phase. The entry turbine speed, in combination with predicted turbine speed for the new speed ratio, provides an indication of the inertia torque required to effect the shift. With this information, the clutch pressures are scheduled so that the time required to effect the shift varies in direct relation to the required change in turbine speed $N_t$ for any value of input torque $T_i$. However, some input torque dependency may be introduced if it is desired to stretch-out or soften off-pattern shifts, such as high speed-low torque upshifts.

The status of the torque converter clutching device 26 also affects the scheduled pressure. If the clutching device 26 is disengaged during the shift, the torque converter 24 effectively isolates the inertia of the engine 12, and the on-coming clutching device must only overcome the turbine inertia. If the clutching device 26 is engaged during the shift, the inertia torque must be significantly greater since both the engine and turbine inertias must be overcome.

In mechanizing the determination of $T_v$, the gear set input torque $T_i$ is calculated as a function of the engine manifold absolute pressure (MAP), the engine pumping efficiency (K), a mechanical friction term ($T_f$), the accessory load torque ($T_L$), and the torque multiplication ratio ($T_c$) of the torque converter 24 according to the following expression:

$$T_i = [(MAP \times K) - T_f - T_L] \times T_c$$

The engine MAP is determined from the sensor 296, while the efficiency K is stored based on previously determined data. The mechanical friction term $T_f$ is determined as a function of engine speed, and the load torque term $T_L$ is determined by loading indicators. The torque multiplication ratio $T_c$ is determined as a function of the speed ratio $N_t/N_e$.

Figure 7:
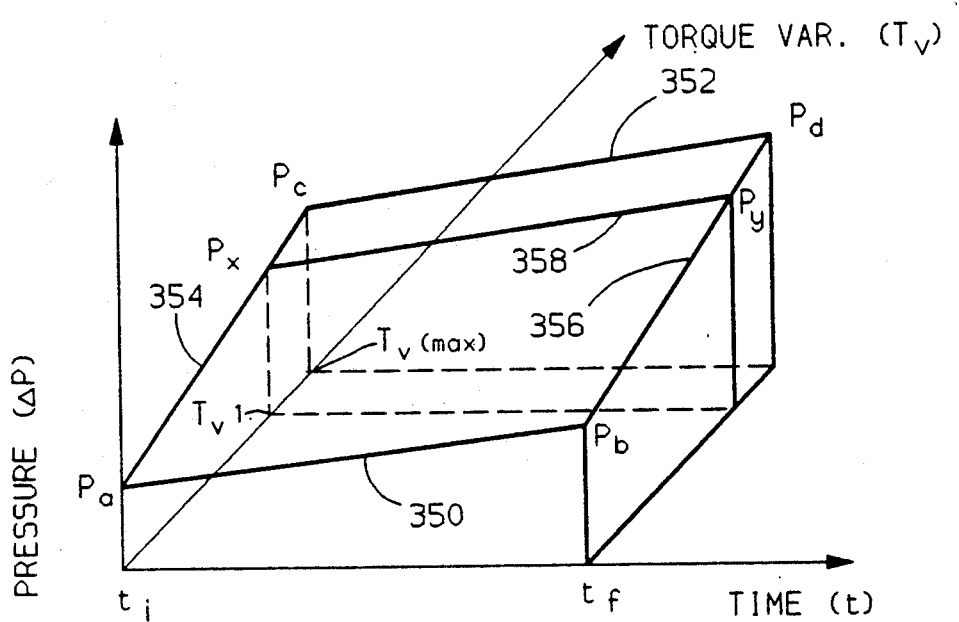
FIGS. 7-9 graphically depict control parameters used in the development of adaptive pressure correction.

In practice, the desired pressure for the on-coming clutch is stored as a function of the torque variable $T_v$ and time, as graphically depicted in FIG. 7. For any given value of torque variable $T_v$, the pressure vs. time schedule is defined by a pair of pressure endpoints, one such endpoint corresponding to an initial time $t_i$, and the other corresponding to a final time $t_f$. The time $t_i$ marks the beginning of the torque phase, and the time $t_f$ marks the end of the inertia phase. If the calculated torque variable $T_v$ is zero or near-zero, for example, the pressure vs. time schedule is defined by the line 350 connecting the pressure endpoints $P_a$ and $P_b$. If the calculated torque variable $T_v$ is very high, as designated by $T_v$(max), the pressure vs. time schedule is defined by the line 352 connecting the pressure endpoints $P_c$ and $P_d$. In practice, only the four pressure endpoints $P_a$, $P_b$, $P_c$, and $P_d$ need be stored by the control unit 270. For any calculated torque variable value $T_{vl}$ between zero and $T_v$(max), the initial pressure $P_x$ is linearly interpolated along the line 354 connecting the initial pressure endpoints $P_a$ and $P_c$, and the final pressure $P_y$ is linearly interpolated along the line 356 connecting the final pressure endpoints $P_b$ and $P_d$. In such case, the pressure vs. time schedule for the shift would be defined by the line 358 connecting the initial and final pressures $P_x$ and $P_y$. The time ($t_f$ – $t_i$) for a given shift is empirically derived and stored in the memory of control unit 270. It should be understood, of course, that the pressure schedules may be defined by three or more pressure endpoints, if desired, using the techniques described herein.

Although the use of predetermined pressure schedules as set forth above provides good results in a well calibrated system, it is recognized as demonstrated above in reference to FIGS. 4-6 that adaptive compensation is needed to correct for variations in system performance which affect the inertia phase torque. To this end, the predetermined pressure schedule of FIG. 7 is adaptively compensated by developing an adaptive pressure correction amount in relation to the comparison between a reference inertia phase interval $t_{rip}$ and a measure of the actual inertia phase interval $t_{ip}$. If the comparison indicates that $t_{ip}$ is too long, the correction amount serves to increase the applied pressure in subsequent shifts to that ratio. If the comparison indicates that $t_{ip}$ is too short, the correction amount serves to decrease the applied pressure in subsequent shifts to that ratio. Different reference interval schedules are used depending on the shift mode.

Figure 8:
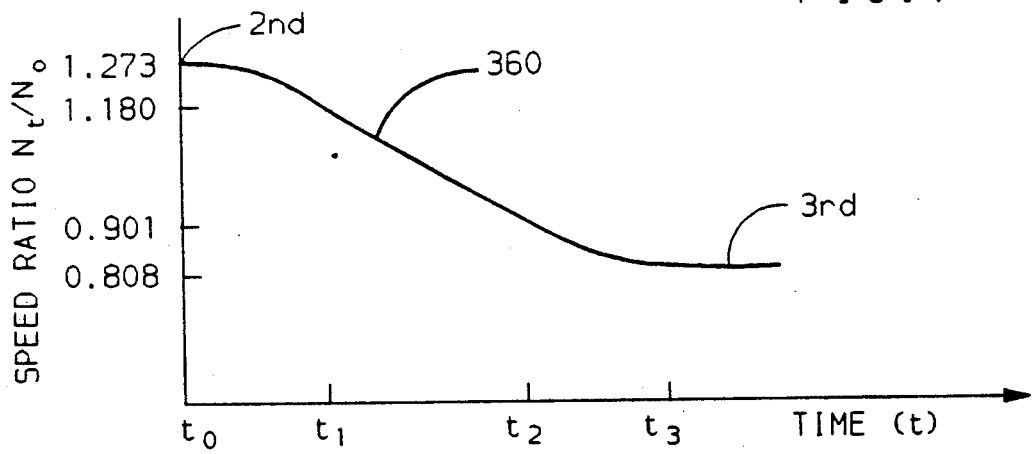

The actual inertia phase interval $t_{ip}$ is determined in the course of each upshift by monitoring the speed ratio $N_t/N_o$. The initial and final ratios are known, and the control unit 270 continuously computes the percent of ratio completion, %RAT. Algebraically, %RAT is given by the expression:

%RAT = |RAT$_{meas}$ – RAT$_{old}$| / |Rat$_{new}$ – RAT$_{old}$| where RAT$_{meas}$ is the actual ratio, RAT$_{old}$ is the ratio of the previously engaged speed ratio, and RAT$_{new}$ is the ratio of the desired speed ratio. The speed ratio for a typical 2-3 ratio shift is graphically represented by the trace 360 of FIG. 8. In such example, the ratio changes from the second speed ratio value of 1.273 RPM/RPM to the third speed ratio value of 0.808 RPM/RPM. Technically, the inertia phase of the shift begins at time $t_0$ when the turbine speed (and hence, the ratio) begins to change, and ends at time $t_3$ when the ratio reaches the third speed ratio value of 0.808 RPM/RPM. However, the initial and final nonlinearity of the trace makes measurement of the interval $t_0$–$t_3$ somewhat difficult. To obtain a more repeatable indication of the inertia phase interval $t_{ip}$ and to permit reliable extrapolation of the available data, $t_{ip}$ is defined as the interval between 15% and 85% of ratio completion. In the example of FIG. 8, the ratio change is 15% complete (1.180 RPM/RPM) at time $t_1$ and 85% complete (0.901 RPM/RPM) at time $t_2$.

Adaptive corrections to the predetermined pressure schedule are also made in the event of a significant underpressure condition. As indicated in the example of FIG. 6, the control unit is adapted to increase the on-coming clutch pressure independent of the open-loop commanded pressure if it is determined that rate of change of speed ratio is less than a reference rate. The need for closed-loop pressure increases implies a rather severe pressure deficiency in the predetermined pressure schedule used to perform the shift. In such cases, the normal end-of-fill detection (turbine speed turn-down) occurs much later than the actual end of fill, and adaptive corrections to the predetermined fill time, if any, are limited to a relatively small value. Instead, the control unit develops an adaptive pressure correction amount for the open-loop pressure schedule in relation to the amount of closed-loop pressure required to achieve the desired rate of change of ratio.

Figure 9:
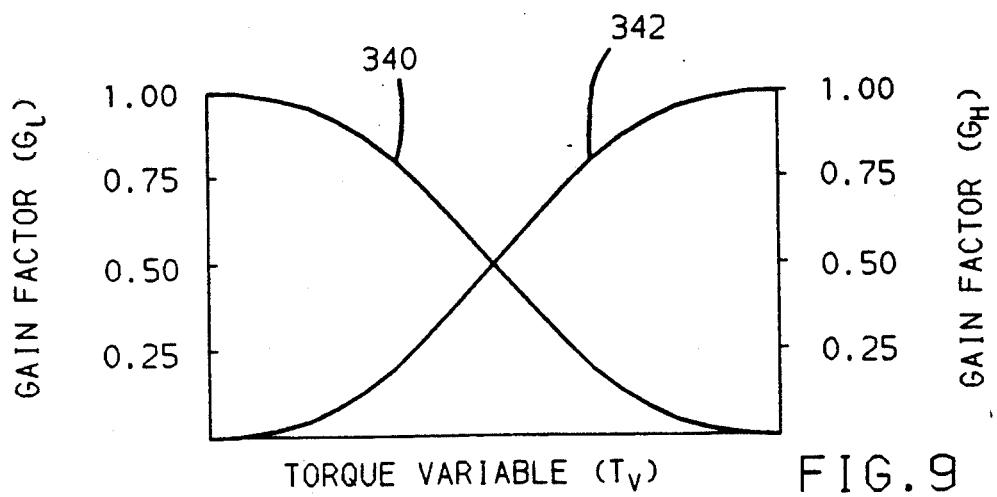

Adaptive correction amounts, whether derived from closed-loop pressure control or measurements of shift completion time, are stored in either a Normal mode correction table or a Performance mode correction table, depending on the shift mode selected by the driver and how the correction amount is developed, separate tables being provided for each type of shift (2-3 upshifts, for example). In each table, the correction values are represented by two data points: a high torque data point and a low torque data point. Once the control unit determines which table the correction amount should be applied to, a pair of gain factors ($G_H$, $G_L$) determined as a function of the torque variable $T_v$ during the shift are applied to the correction amount to develop adaptive updates for the respective high and low torque data points. FIG. 9 graphically depicts the gain factors $G_H$ and $G_L$ as a function of the torque variable $T_v$. When the same type of shift occurs in the future, the adaptive correction for the base table pressure command is determined as a function of the torque variable $T_v$, linearly interpolating between the high and low torque data points of the appropriate correction table(s).

In the case of a Normal mode upshift, the pressure supplied to the on-coming clutch in subsequent shifts to the same ratio is determined as a combined function of the predetermined pressure schedule and a correction amount from the Normal mode correction table. In the case of a Performance mode upshift, the pressure is determined as a combined function of the predetermined pressure schedule, the Normal mode adaptive correction amount, and a correction amount from the Performance mode correction table. Due to the adaptive correction, changing conditions which affect the inertia phase interval are compensated for after a number of such upshifts.

As described in reference to FIG. 3, the Performance mode pressure begins at the Normal mode pressure level and ramps up to a higher Performance mode level over the course of the shift, providing a smooth shift entry with an exciting finish. The difference between the Normal and Performance mode pressures is the inclusion of the Performance mode correction table in the clutch pressure calculation. The Performance mode correction table is limited to a minimum value regardless of the adaptive pressure corrections so as to maintain at least a minimum pressure differentiation between the Normal and Performance modes.

Usually, correction amounts determined during a Normal mode shift are stored in the Normal mode correction table, and correction amounts determined during a Performance mode shift are stored in the Performance mode correction table. However, if a Performance mode adaptive correction amount would reduce the Performance mode correction table value below the minimum level, and the correction amount is significant, it is applied to the Normal mode correction table instead.

Since the shift is initiated at the Normal mode pressure regardless of the shift mode selected by the driver, adaptive corrections based on closed-loop pressure increases indicate a Normal mode underpressure condition. Consequently, closed-loop pressure corrections, if any, are applied to the Normal mode correction table regardless of the shift mode selected by the driver. The correction affects the Performance mode as well as the Normal mode since the Performance mode pressure is determined in part by the correction amounts stored in the Normal mode correction table.

Figure 10:
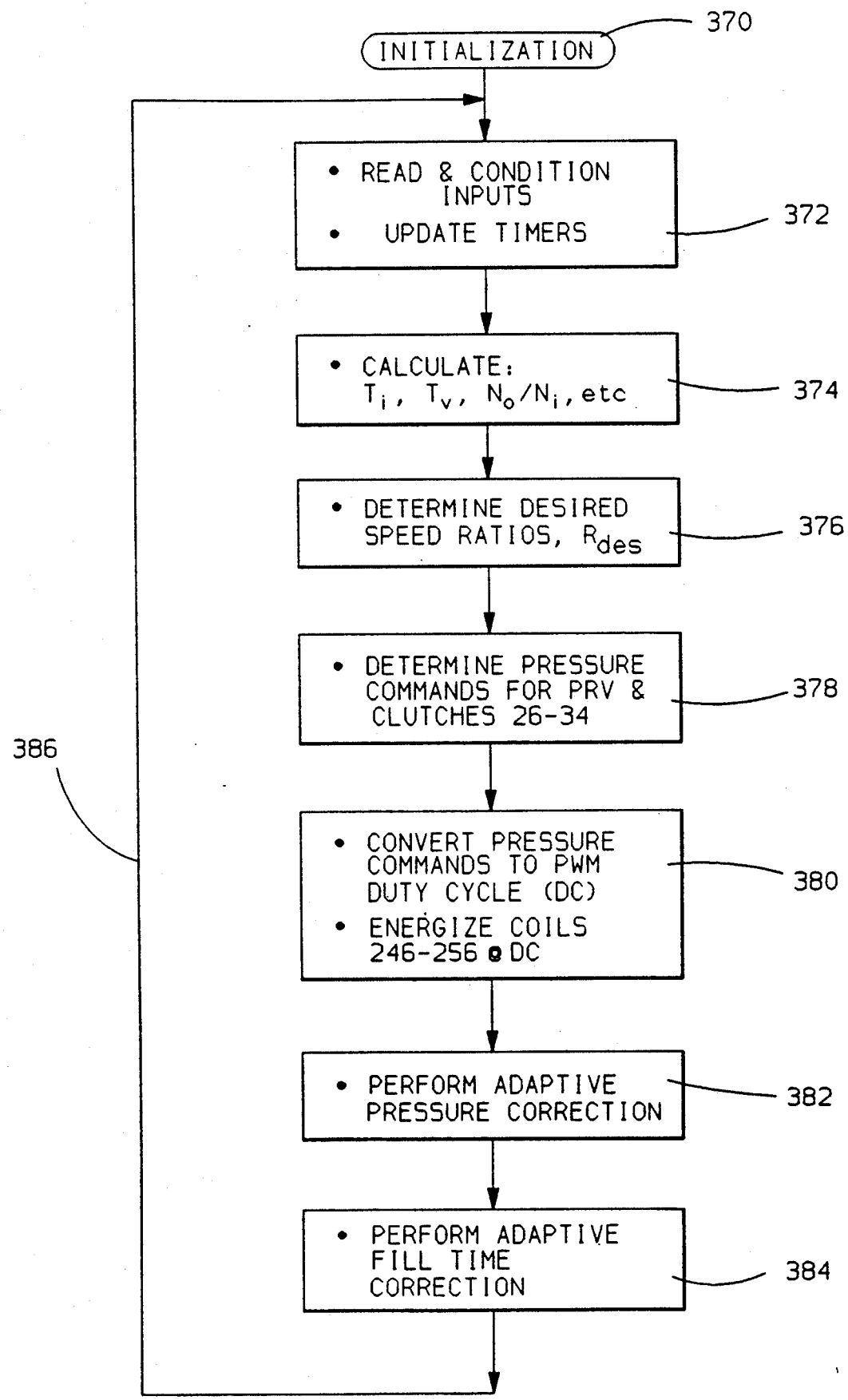
FIGS. 10-16 depict flow diagrams executed by the computer-based controller of FIG. 1a in carrying out the control of this invention.

The flow diagrams depicted in FIGS. 10-16 represent program instructions to be executed by the microcomputer 302 of control unit 270 in mechanizing ratio shifting and the adaptive control functions of this invention. The flow diagram of FIG. 10 represents a main or executive program which calls various subroutines for executing particular control functions as necessary. The flow diagrams of FIGS. 11-16 represent the functions performed by those subroutines which are pertinent to the present invention.

Referring now more particularly to FIG. 10, the reference numeral 370 designates a set of program instructions executed at the initiation of each period of vehicle operation for initializing the various tables, timers, etc., used in carrying out the control functions of this invention. Following such initialization, the instruction blocks 372-384 are repeatedly executed in sequence, as designated by the flow diagram lines connecting such instruction blocks and the return line 386. Instruction block 372 reads and conditions the various input signals applied to I/O device 300 via the lines 272-285, and updates (increments) the various control unit timers. Instruction block 374 calculates various terms used in the control algorithms, including the input torque $T_i$, the torque variable $T_v$, and the speed ratio $N_o/N_i$. Instruction block 376 determines the desired speed ratio, $R_{des}$, in accordance with a number of inputs including throttle position, vehicle speed, and manual valve position. In transmission control, this function is generally referred to as shift pattern generation. Instruction block 378 determines the clutching device pressure commands for effecting a ratio shift, if required. The pressure commands for the pressure regulator valve PRV and nonshifting clutching devices are also determined.

An expanded description of the instruction block 378 is set forth below in reference to the flow diagrams of FIGS. 11-14. Instruction block 380 converts the clutching device and PRV pressure commands to a PWM duty cycle based on the operating characteristics of the various actuators (empirically determined), and energizes the actuator coils accordingly. Instruction block 382 relates to the determination of adaptive corrections for the empirically derived clutch pressure schedules, and is discussed in more detail below in reference to FIGS. 15-16. Instruction block 384 relates to the determination of adaptive corrections for the empirically derived clutch fill times, as set forth for example in Downs et al., U.S. Pat. No. 4,707,789 issued Nov. 17, 1987, and assigned to General Motors Corporation.

Figure 11:
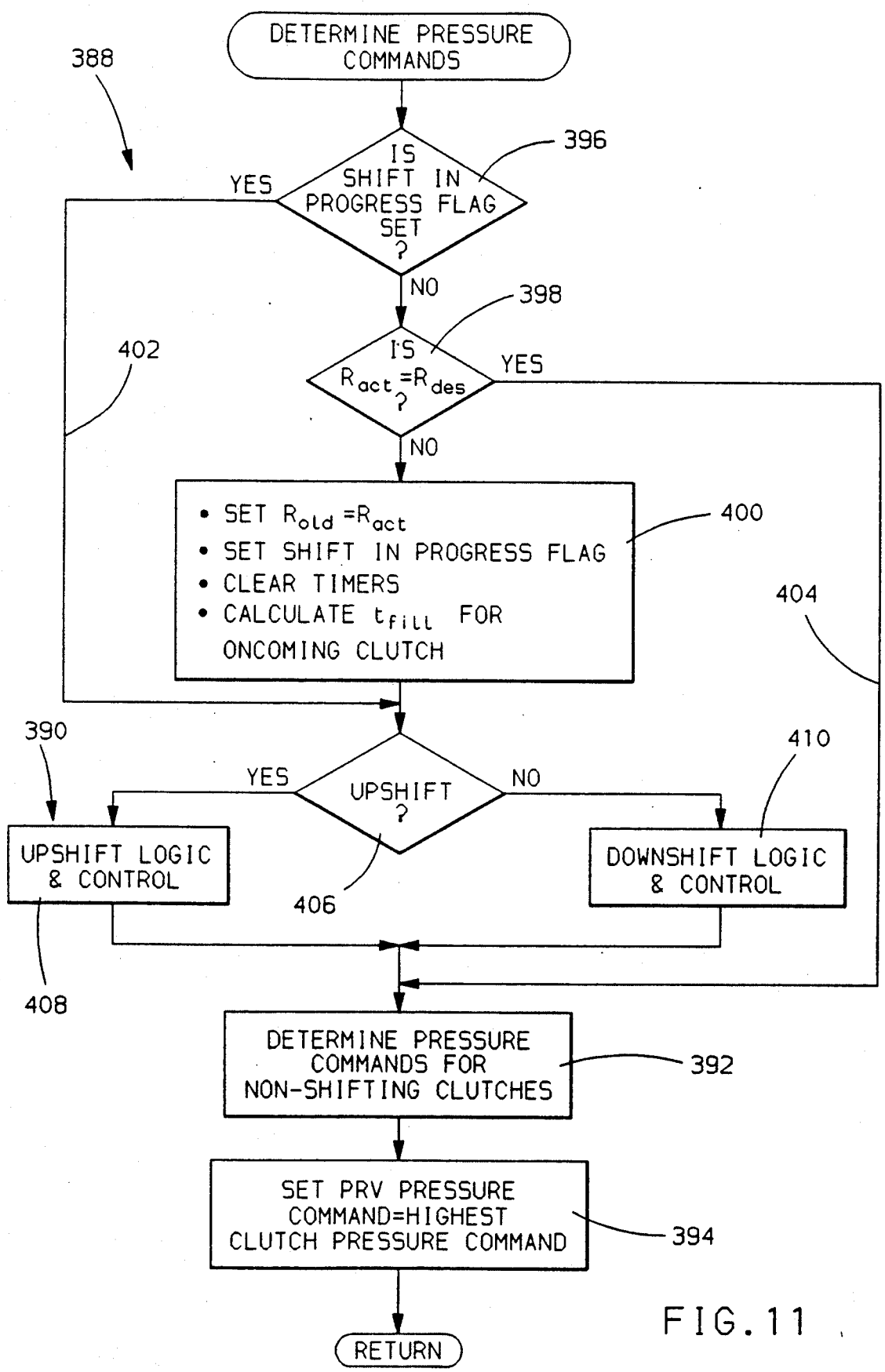
Figure 12:
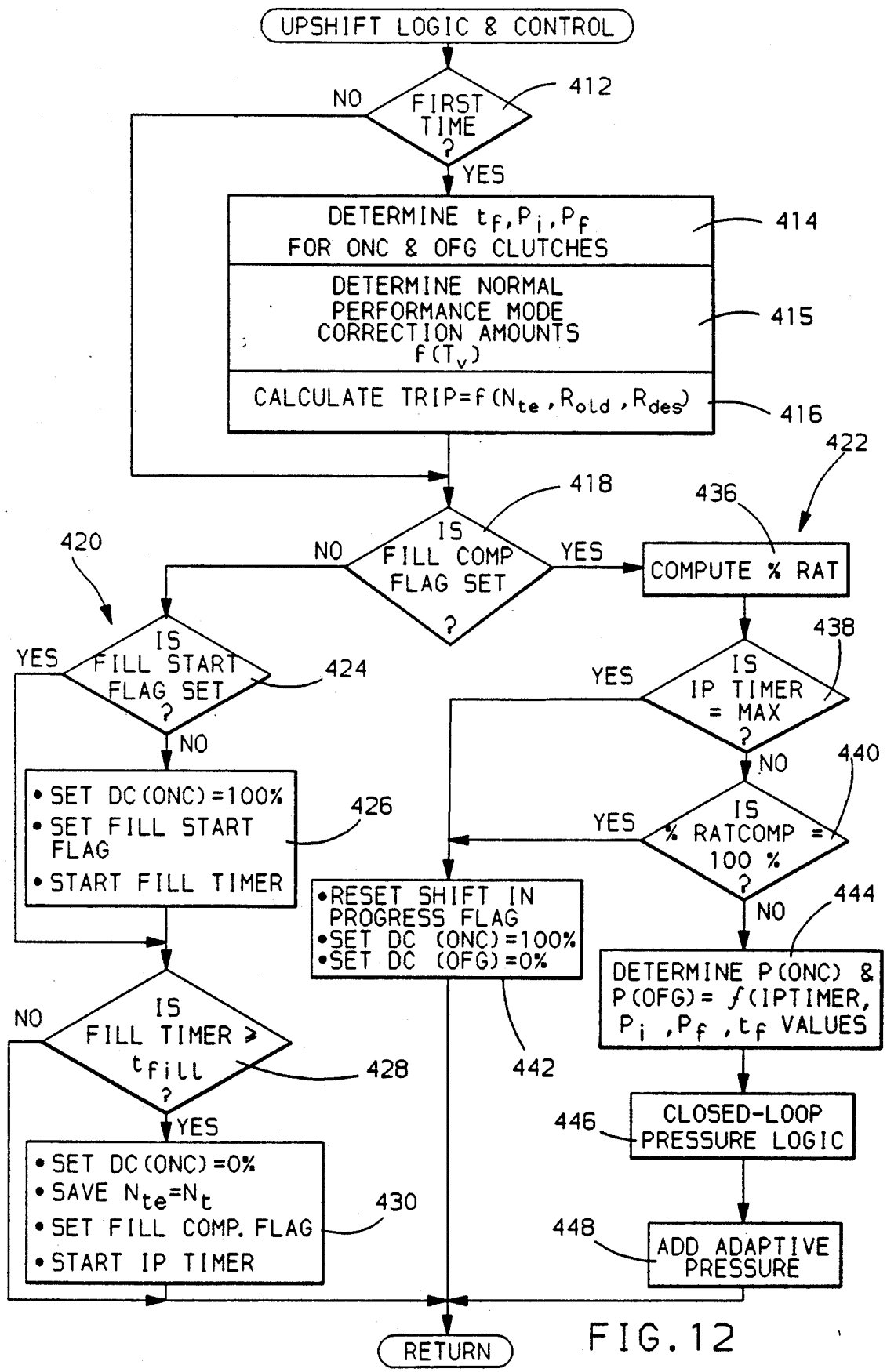

As indicated above, the flow diagrams of FIGS. 11 and 12 set forth the clutch and PRV pressure determination algorithm generally referred to at the main loop instruction block 378 of FIG. 10. On entering such algorithm, the blocks designated generally by the reference numeral 388 are executed to set up initial conditions if a shift is desired. If a shift is desired, the blocks designated generally by the reference numeral 390 are executed to develop pressure commands for the clutching devices involved in the shift. Thereafter, the instruction blocks 392 and 394 are executed to develop pressure commands for the nonshifting clutches and the pressure regulator valve PRV, completing the routine. As indicated at instruction block 394, the pressure command for the regulator valve PRV is set equal to the highest of the pressure commands for the various clutching devices.

The blocks designated by the reference numeral 388 include the decision block 396 for determining if a shift is in progress as indicated by the "SHIFT IN PROGRESS" flag; the decision block 398 for determining if the actual speed ratio $R_{act}$ (that is, $N_o/N_t$) is equal to the desired speed ratio $R_{des}$ determined at instruction block 376 of FIG. 10; and the instruction block 400 for setting up the initial conditions for a ratio shift. The instruction block 400 is only executed when decision blocks 396 and 398 are both answered in the negative. In such case, instruction block 400 serves to set the old ratio variable, $R_{old}$, equal to $R_{act}$, to set the "SHIFT IN PROGRESS" flag, clear the shift timers, and to calculate the fill time $t_{fill}$ for the on-coming clutching device. If a shift is in progress, the execution of blocks 398 and 400 is skipped, as indicated by the flow diagram line 402. If no shift is in progress, and the actual ratio equals the desired ratio, the execution of instruction block 400 and the blocks designated by the reference numeral 390 is skipped, as indicated by the flow diagram line 404.

The blocks designated by the reference numeral 390 include the decision block 406 for determining if the shift is an upshift or a downshift; the instruction block 408 for developing pressure commands for the active (shifting) clutching devices if the shift is an upshift; and the instruction block 410 for developing the pressure commands for the active clutching devices if the shift is a downshift. To illustrate how such pressure commands are developed, the steps involved in the development of a typical power-on upshift (i.e., instruction block 408) are set forth in the flow diagram of FIG. 12.

On entering the flow diagram of FIG. 12, the control unit executes a shift initializing routine comprising the blocks 412-416. In the first execution of the routine in a given shift, determined by the decision block 412, the instruction blocks 414 and 416 are executed to determine the pressure parameters $P_i$, $P_f$ and $t_f$ for the on-coming (ONC) and off-going (OFG) clutching devices, and to calculate the reference inertia phase interval $t_{rip}$ as a function of $N_{te}$, $R_{old}$ and $R_{des}$. In subsequent executions of the routine, decision block 412 is answered in the negative.

Decision block 418 is then executed to determine if the fill phase of the shift is completed, as indicated by the "FILL COMP" flag. If not, the flow diagram branch, generally designated by the reference numeral 420, is executed; if so, the flow diagram branch, generally designated by the reference numeral 422, is executed.

The flow diagram branch 420 includes a fill initializing routine comprising the blocks 424 and 426 and a fill completion routine comprising the blocks 428 and 430. At the beginning of each shift, the "FILL COMP" flag is not set, and the decision block 424 of the fill initializing routine is executed to determine if the fill phase has started, as indicated by the "FILL START" flag. Initially, the "FIIL START" flag is not set, and instruction block 426 is executed to set the energization duty cycle of the on-coming clutching device, DC(ONC), equal to 100%, to set the "FILL START" flag, and to start a FILL TIMER. Thereafter, decision block 424 is answered in the affirmative, and execution of instruction block 426 is skipped. Decision block 428 of the fill completion routine determines if the count in FILL TIMER is greater than or equal to the fill time $t_{fill}$ determined at instruction block 400 of FIG. 11. If so, instruction block 430 is executed to save the entry turbine speed $N_{te}$, to set the "FILL COMP" flag, and to start the inertia phase timer, IP TIMER. If decision block 428 is answered in the negative, the fill phase is incomplete, and execution of the instruction block 430 is skipped.

After the fill period has elapsed and decision block 418 is answered in the affirmative, the flow diagram branch 422 is executed to complete the shift. First, the instruction block 436 is executed to calculate the value of the term %RAT for use in the adaptive pressure correction algorithm. Then the decision blocks 438 and 440 are executed to determine if the count in IP TIMER is at a maximum value, MAX, or if the term %RAT is substantially equal to 100%. If either of the decision blocks 438 or 440 are answered in the affirmative, the shift is complete and instruction block 442 is executed to reset the "SHIFT IN PROGRESS" flag, to set the on-coming duty cycle, DC(ONC), equal to 100%, and to set the off-going duty cycle, DC(OFG), equal to 0%. If both decision blocks 438 and 440 are answered in the negative, instruction blocks 444-448 are executed to determine the on-coming and off-going pressure commands, P(ONC) and P(OFG). The instruction block 444 determines the base pressure commands as a function of the $P_i$, $P_f$, $t_f$, and IP TIMER values determined at instruction block 414, the instruction block 446 determines if any closed-loop pressure should be added to ensure proper progression of the shift, and the instruction block 448 adjusts the scheduled pressures by the adaptive pressure correction amounts, if any. The instruction blocks 446 and 448 are detailed in the flow diagrams of FIGS. 13 and 14, respectively.

Figure 13:
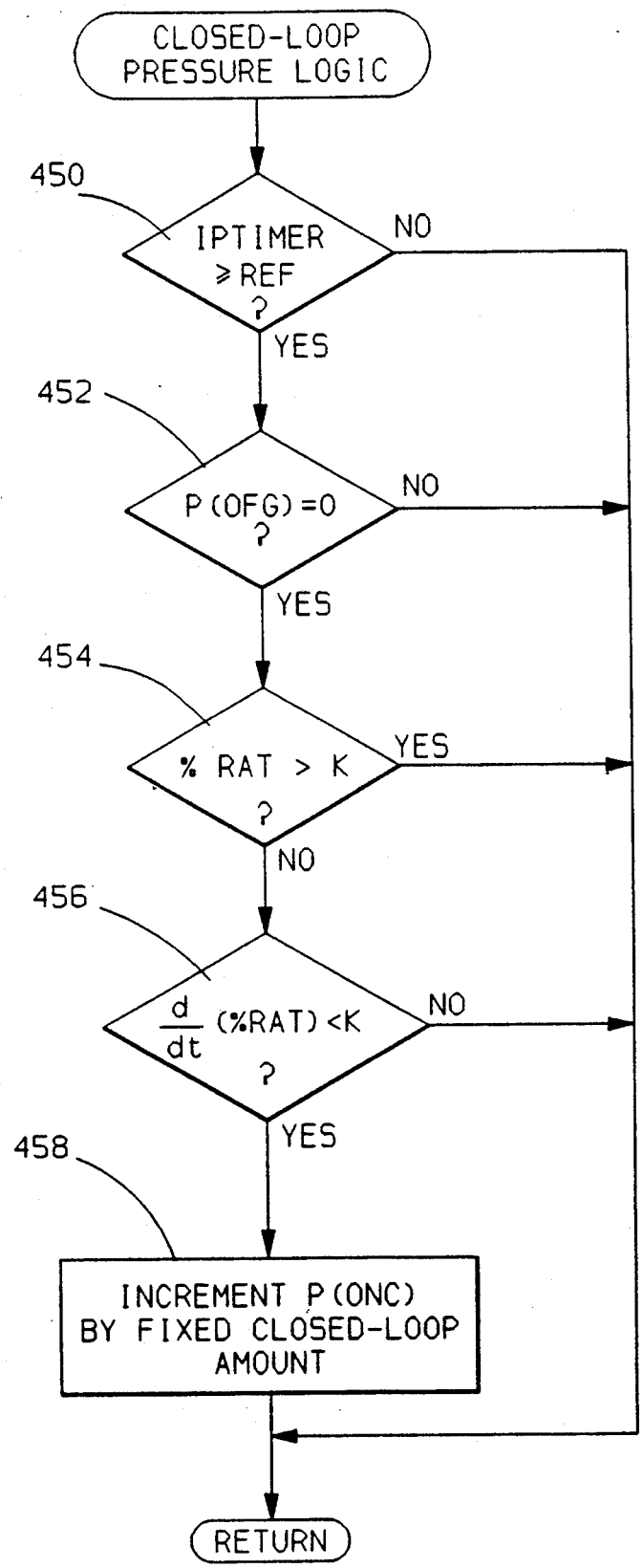

Referring to the closed-loop pressure logic flow diagram of FIG. 13, the decision blocks 450-456 are sequentially executed to determine if the addition of closed-loop pressure is required to timely complete the shift. As a first condition (decision block 450), the inertia phase timer must equal or exceed a reference amount corresponding to the earliest allowable point in the shift at which closed-loop pressure should be added. As a second condition (decision block 452), the off-going pressure command P(OFG) must be zero. As a third condition (decision block 454), the percent ratio completion term %RAT must be less than or equal to a reference value K so as to terminate closed-loop pressure control when the shift is nearly complete. As a fourth condition (decision block 456), the ratio progression—as judged by the rate of change of %RAT, for example—must be less than a predetermined value. If all four conditions are met, the instruction block 458 is executed to increment the pressure command P(ONC) by a predetermined amount, completing the routine.

Figure 14:
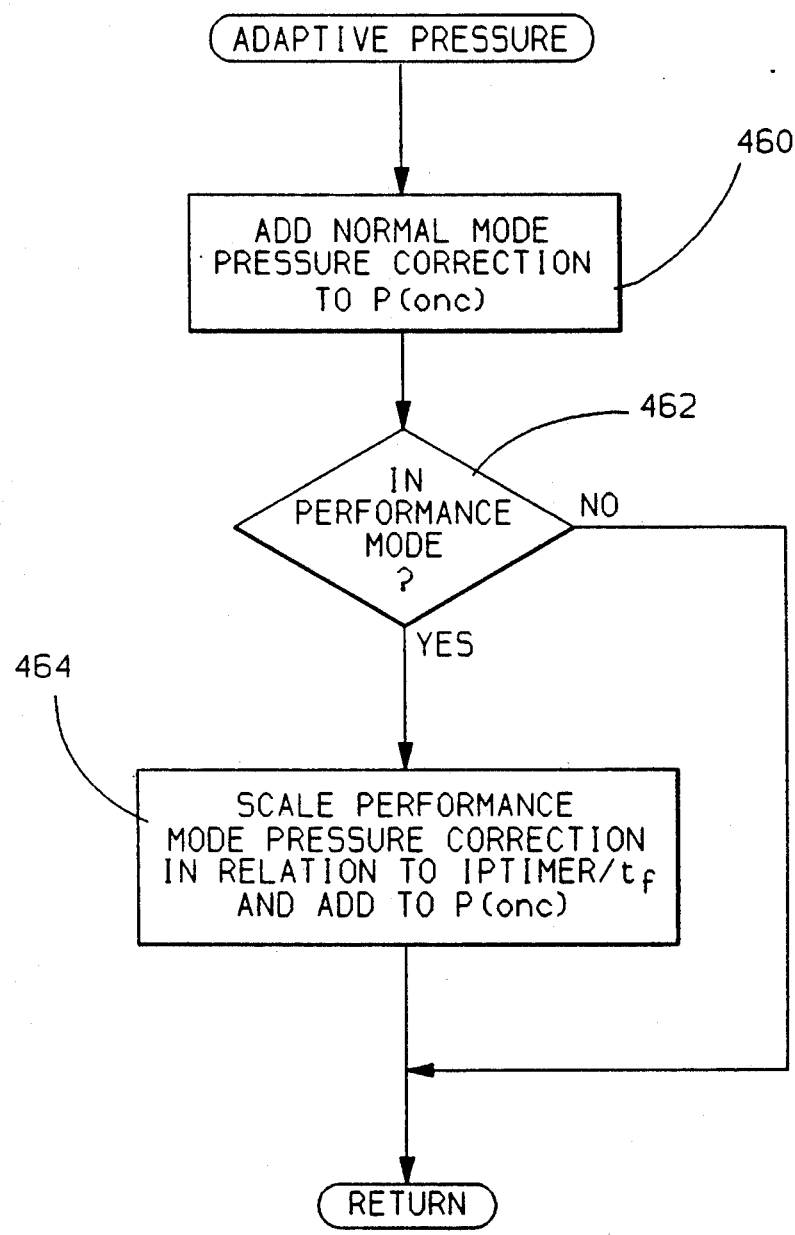

Referring to the Adaptive Pressure routine flow diagram of FIG. 14, the instruction block 460 is first executed to add the Normal mode pressure correction amount determined at instruction block 415 of FIG. 12 to the on-coming pressure command P(ONC). If the Performance mode is selected, as determined at decision block 462, the instruction block 464 is also executed to adjust the pressure command P(ONC) in relation to the Performance mode pressure correction as well. As indicated above, the Performance mode correction amount is ramped in so that the pressure is initiated at the Normal mode level and ends up at the Performance mode level. To this end, the Performance mode correction amount determined at instruction block 415 of FIG. 12 is multiplied by the ratio (IP TIMER/$t_f$) before being added to the pressure command P(ONC).

Figure 15:
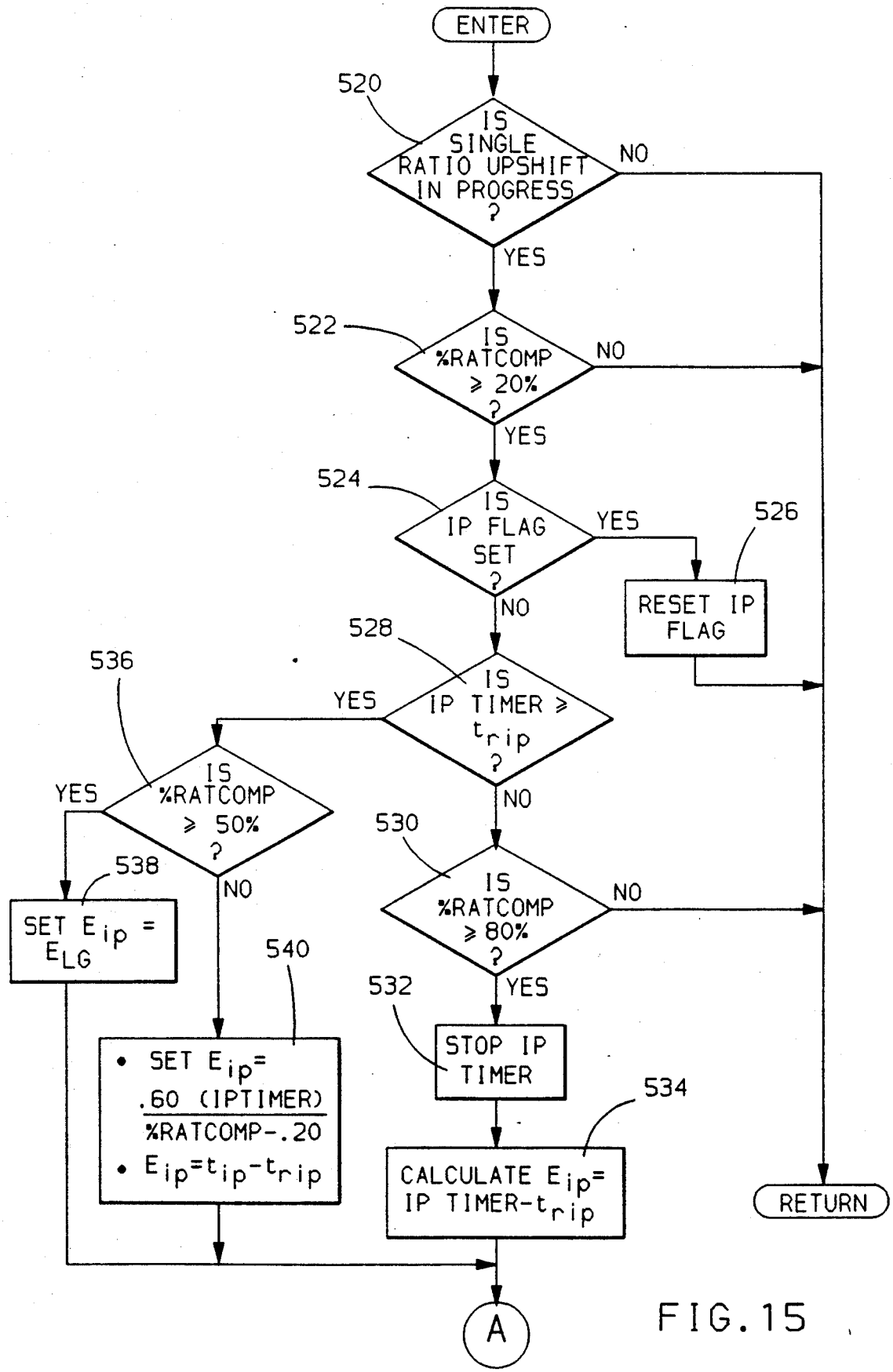
Figure 16:
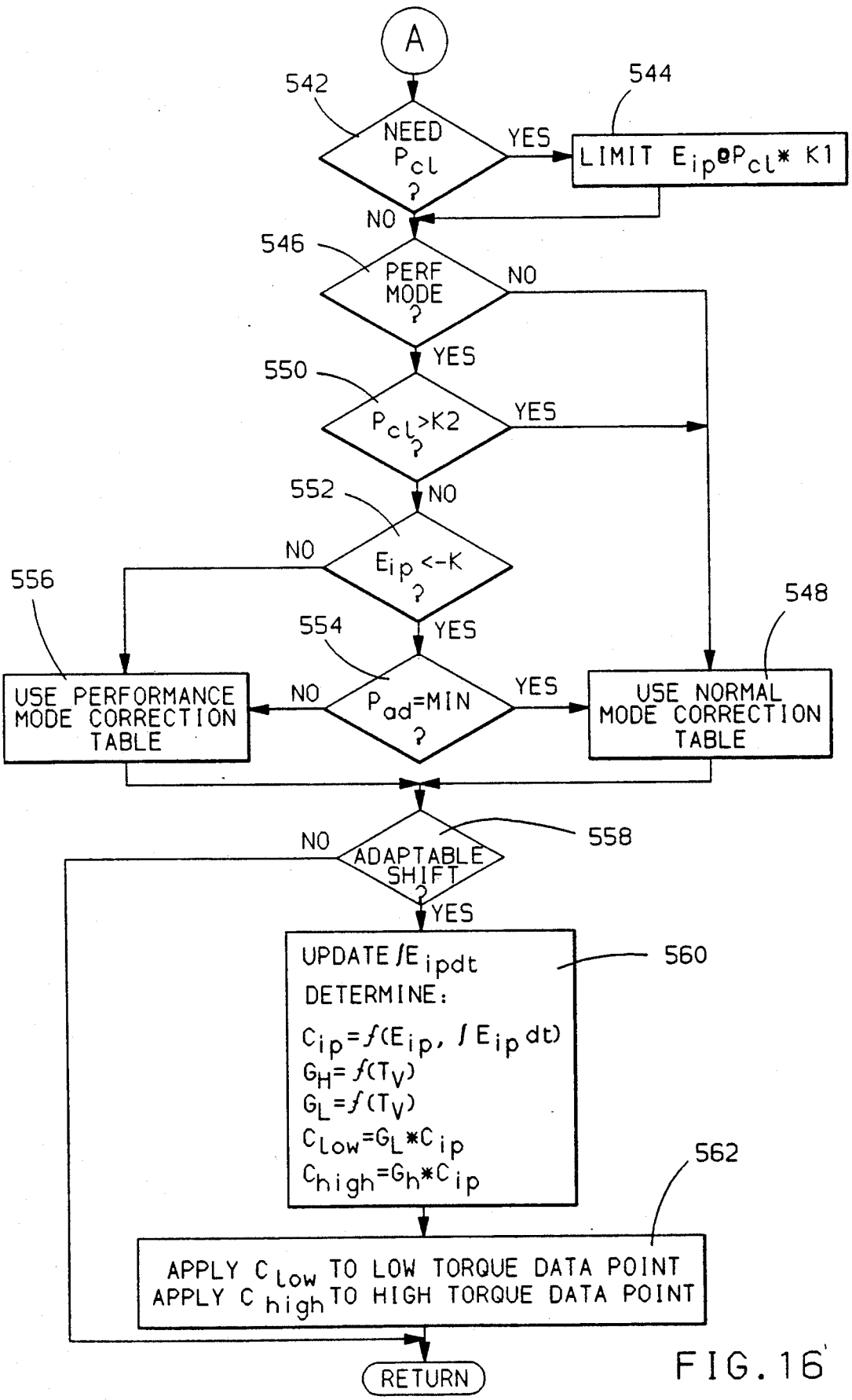

The flow diagram of FIGS. 15–16 details the adaptive pressure correction routine referenced by the main flow diagram instruction block 382 of FIG. 10. The routine comprises the steps of obtaining a measure $t_{ip}$ of the inertia phase interval, comparing $t_{ip}$ to a reference interval $t_{rip}$ to obtain an inertia phase error term $E_{ip}$, and developing an adaptive correction amount in relation to $E_{ip}$ and the time integral of $E_{ip}$. The measured interval begins when the ratio shift is 15% complete and ends when the ratio shift is 85% complete, as judged by the term %RAT. The routine includes an initializing portion, an interval measurement portion, and a correction portion. The initializing portion comprises the blocks 520–526; the interval measurement portion comprises the blocks 528–540; and the correction portion comprises the blocks 542–562.

In the initializing portion of the routine, the decision blocks 520 and 522 are executed to determine if a single ratio upshift is in progress, and if the ratio shift is at least 15% complete, as judged by the term, %RAT. If either of the decision blocks 520 and 522 are answered in the negative, the remainder of the flow diagram is skipped, as indicated by the flow diagram return line 550. When both are answered in the affirmative, the decision block 524 is executed to determine if the IP flag is set. This flag marks the beginning of the measured inertia phase interval, and is set by the instruction block 526 the first time that decision block 524 is executed. Thereafter, instruction block 524 is answered in the negative, and the measurement portion of the routine is entered.

In the measurement portion of the routine, the decision block 528 is executed to compare the count in the IP TIMER with the reference interval, $t_{rip}$. So long as the count in IP TIMER is less than $t_{rip}$, the blocks 530–534 are executed to stop IP TIMER at 85% completion and to calculate the inertia phase error $E_{ip}$ according to the difference (IP TIMER-$t_{rip}$). However, when the count in IP TIMER exceeds $t_{rip}$, the blocks 536–540 are executed to either (1) set the error $E_{ip}$ at a predetermined large value, $E_{LG}$, if the shift is less than 50% complete, or (2) compute the error $E_{ip}$ in relation to the difference between $t_{rip}$ and a linear extrapolation of the inertia phase time, $t_{ip}$. In the later case, the time $t_{ip}$ is extrapolated from the current values of IP TIMER and %RAT, as indicated at instruction block 540 by the expression:

$$t_{ip} = (IPTIMER * 0.70)/(\%RAT - 0.15)$$

In the correction portion of the routine (FIG. 16), the decision block 542 is first executed to determine if the Upshift Logic and Control routine employed closed-loop pressure increases to force proper progression of the shift. If so, the amount of closed-loop pressure, not the inertia phase error, should be used to generate an adaptive pressure correction. In this case, the instruction block 544 is executed to limit the inertia phase error term $E_{ip}$ to a predetermined fraction (K1) of the closed-loop pressure modification $P_{cl}$. If the shift was a Normal mode shift, as determined at decision block 546, the instruction block 548 is executed to indicate that the correction amount, if any, should be applied to the Normal mode correction table.

If the shift was a Performance mode shift, the decision blocks 550, 552 and 554 determine whether the correction amount, if any, should be applied to the Normal mode correction table instead of the Performance mode correction table. If the closed-loop pressure increment $P_{cl}$ was greater than a reference amount K2, as determined by decision block 550, the initial clutch pressure command was too low, and instruction block 548 is executed to apply the correction amount (limited in relation to $P_{cl}$ per block 544) to the Normal mode correction table. If the inertia phase error $E_{ip}$ is reflective of a significant overpressure condition (i.e., $E_{ip} < -K$) and the Performance adaptive correction amount is at the minimum value, as determined by decision blocks 552–554, a Normal mode overpressure condition is also indicated, and instruction block 548 is executed to apply the corresponding correction amount to the Normal mode correction table. Otherwise, the instruction block 556 is executed to apply the correction amount, if any, to the Performance mode correction table.

Once it is determined where the adaptive correction amount, if any, is to be applied, the decision block 558 is executed to determine if the various parameters monitored in the course of the shift are indicative of an adaptable shift. Such parameters may include stable throttle position, positive torque, and satisfactory oil temperature throughout the shift. If decision block 558 is answered in the affirmative, an adaptive pressure correction may be reliably made and the instruction blocks 560 and 562 are executed to update the low and high torque data points of the designated correction table in relation to the error $E_{ip}$ and the time integral of $E_{ip}$. The instruction block 560 updates the time integral of $E_{ip}$ and calculates a number of terms including the inertia phase pressure correction $C_{ip}$, the gain factors $G_H$ and $G_L$, and the actual data point correction amounts $C_{high}$ and $C_{low}$. Instruction block 562 then applies the data point correction amounts $C_{high}$ and $C_{low}$ to the high and low torque data points of the designated table.

The correction amount $C_{ip}$ is determined as a function of $E_{ip}$ and the time integral of $E_{ip}$, and the gain factors $G_L$ and $G_H$ are determined as a function of gain factors $G_L$ and $G_H$ are determined as a function of the torque variable $T_v$ as illustrated in FIG. 9. The respective gain factors are multiplied by the correction amount $C_{ip}$ to determine the data point correction amounts $C_{high}$ and $C_{low}$. In future shifts, the pressure supplied to the subject clutching device will result in an inertia phase interval more nearly equal to the reference interval $t_{rip}$, and a more nearly optimum quality shift.

While this invention has been described in reference to the illustrated embodiment, it will be understood that various modifications will occur to those skilled in the art, and that systems incorporating such modifications may fall within the scope of this invention which is defined by the appended claims.

The embodiments of the invention in which an exclusive property or privilege is claimed are defined as follows:

1. Control apparatus for a motor vehicle multiple speed ratio automatic shift transmission having a fluid operated clutch associated with a specified speed ratio, wherein shifting to said specified speed ratio includes a completion phase during which fluid is supplied to the clutch to initiate and progressively increase torque transmission therethrough, the control apparatus comprising:

driver operated switch means for selecting either a normal or performance shift mode;

base table means for storing a predetermined schedule of fluid pressure to be supplied to said clutch during said completion phase;

pressure correction means for developing an adaptive correction amount for said predetermined schedule in relation to a comparison between an expected duration of said completion phase and an actual duration of said completion phase;

means for applying the adaptive correction amount (1) to a normal mode correction table when said normal shift mode is selected, and (2) to a performance mode correction table when the performance shift mode is selected;

means for supplying the fluid to said clutch in accordance with a combination of said predetermined pressure schedule and a normal mode correction amount determined from said normal mode correction table when said normal shift mode is selected; and means for supplying the fluid to said clutch in accordance with a combination of said predetermined pressure schedule, a normal mode correction amount determined from said normal mode correction table, and a performance mode correction amount determined from said performance mode correction table when said performance shift mode is selected.

2. The control apparatus set forth in claim 1, wherein:
   the predetermined pressure schedule of said base table means is stored as a function of a torque-related parameter; and
   the correction amount is applied to said normal or performance mode correction tables as a function of said torque-related parameter.

3. The control apparatus set forth in claim 1, wherein:
   the performance mode correction table provides at least a minimum performance correction amount so as to ensure at least a minimum increase in the pressure supplied to said clutch during the performance mode.

4. The control apparatus set forth in claim 3, wherein:
   adaptive correction amounts developed when said performance shift mode is selected which would reduce the performance correction amount below said minimum amount are applied to the normal mode correction table.

5. In a motor vehicle including a driver operated switch for selecting between normal and performance shift modes, and a multiple speed ratio automatic shift transmission having a fluid operated clutch associated with a specified speed ratio, wherein shifting to said specified speed ratio includes a completion phase during which fluid is supplied to the clutch to initiate and progressively increase torque transmission therethrough, a clutch pressure control method comprising the steps of:

retrieving a base pressure value for the completion phase of said shifting from a table of predetermined fluid pressure schedules;

developing an adaptive pressure correction in relation to a comparison between an expected duration of said completion phase and an actual duration of said completion phase;

applying the adaptive pressure correction (1) to a normal mode correction table when the control is operated in said normal shift mode, and (2) to a performance mode correction table when the control is operated in said performance shift mode; and supplying fluid pressure to said clutch (1) in accordance with a combination of said base pressure value and a normal mode correction amount determined from said normal mode correction table when said normal shift mode is selected, and (2) in accordance with a combination of said base pressure value, the normal mode correction amount determined from said normal mode correction table, and a performance mode correction amount determined from said performance mode correction table when said performance shift mode is selected.

6. The method set forth in claim 5, wherein:
   the performance correction amount is progressively introduced when said performance shift mode is selected so that the fluid pressure is initially supplied as though said normal mode were selected.

7. The method set forth in claim 6, including the steps of:
   independently increasing the fluid pressure supplied to said clutch during the completion phase of said shifting if it is determined that the shifting is not progressing at a sufficiently fast rate;
   developing said adaptive pressure correction in relation to the independent increase of said fluid pressure; and
   applying said adaptive pressure correction to said normal mode correction table without regard to said driver operated switch.

* * * * *